United States Patent [19]

Seefeld

[11] Patent Number: 4,572,712
[45] Date of Patent: Feb. 25, 1986

[54] FORAGE BLOWER HAVING POWER TRANSMISSION AND MOUNTING ARRANGEMENT THEREFOR

[75] Inventor: Dean E. Seefeld, West Bend, Wis.
[73] Assignee: Gehl Company, West Bend, Wis.
[21] Appl. No.: 627,753
[22] Filed: Jul. 5, 1984
[51] Int. Cl.⁴ .............................................. B65G 53/58
[52] U.S. Cl. ........................................ 406/101; 74/11; 406/71; 415/122 R
[58] Field of Search .................... 406/57, 71, 80, 96, 406/97, 99–103; 415/122 R; 74/11, 15.4, 15.88

[56] References Cited

U.S. PATENT DOCUMENTS

| | | | |
|---|---|---|---|
| 2,405,695 | 8/1946 | Hitchcock et al. | 406/57 X |
| 3,002,393 | 10/1961 | Browning | 74/11 |
| 3,059,505 | 10/1962 | Reicks | 74/11 X |
| 3,482,456 | 12/1969 | May et al. | 74/11 |
| 3,561,277 | 2/1971 | Boyle et al. | 74/15.4 |
| 3,724,908 | 4/1973 | Burrough et al. | 406/71 |
| 4,425,058 | 1/1984 | Sorensen et al. | 406/100 |

*Primary Examiner*—Jeffrey V. Nase
*Attorney, Agent, or Firm*—James E. Nilles

[57] ABSTRACT

A forage blower having a power transmission unit which is secured to the side wall of the blower housing and to the hub of the blower fan. The mounting arrangement eliminates components required in prior art machines. The unit can be reversed, end for end, to provide two different speeds to the blower fan.

4 Claims, 4 Drawing Figures

FORAGE BLOWER HAVING POWER TRANSMISSION AND MOUNTING ARRANGEMENT THEREFOR

BACKGROUND OF THE INVENTION

This invention relates generally to forage blowers of the type that receive chopped forage from a wagon or other vehicle or the like and convey it upwardly to the top of a silo.

An example of the type of blower to which the present invention pertains generally is shown in the U.S. Pat. No. 3,724,908 issued Apr. 3, 1973 to Burrough et al and which patent has been assigned to an assignee common with the present invention.

The power transmission of prior blowers usually required numerous components to mount them to the blower housing and connect them to the blower fan. In addition, the prior devices only provided a certain speed for the fan, unless complicated transmission and change-speed gear boxes were used.

SUMMARY OF THE INVENTION

The present invention provides a forage blower having a generally vertically positioned blower housing of generally circular shape when viewed in elevation and which has a pair of generally circular and laterally spaced apart side sheets.

A power transmission unit is provided for driving the blower fan and this unit is secured to one side wall of the blower housing and also to the blower fan. This mounting eliminates certain components which were required in prior art blowers.

The unit can be reversed, end for end, to provide either a reduced speed from the PTO shaft to the blower fan or provide an increase in speed from the PTO shaft to the blower fan, all with using the common transmission unit.

These and other objects and advantages of the present invention will appear hereinafter as this disclosure progresses, reference being had to the accompanying drawings in which:

DESCRIPTION OF THE INVENTION

Figure 1:
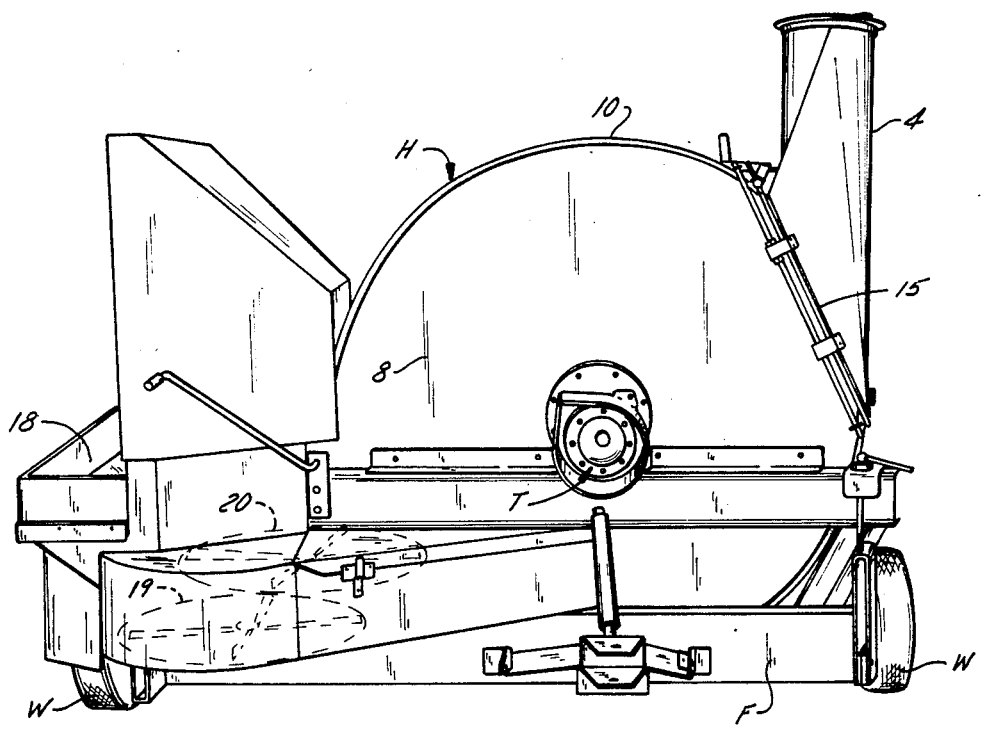
FIG. 1 is a perspective view taken generally from the front side of a forage blower made in accordance with the present invention.

The forage blower provided by the present invention is similar in its general arrangement to that shown in the U.S. Pat. No. 3,724,908 and reference may be had to that patent for certain details which are not believed to be necessary nor desirable to be described in the present disclosure. The blower includes a generally vertically positioned blower housing H of generally circular shape when viewed in elevation, as for example in FIGS. 1 and 2. The blower housing has an outlet opening 2 located adjacent its upper portion. A generally tangentially extending blower outlet transition member 4 extends upwardly from and is in communication with the outlet opening 2.

The housing also has a pair of generally circular and laterally spaced apart side sheets 6 and 8, and a circumferential wall or annular peripheral rim sheet 10 which is slidably mounted around the periphery of the side sheets, when the rim sheet is loosened.

The opposed adjacent ends of the rim sheet are located one on each side of the blower opening 2 and together with the side sheets 6 and 8 define the outlet of the blower housing. These rim sheet ends are adjustably secured together by means of a large U-bolt threaded member 15 which is secured between the ends.

Figure 2:
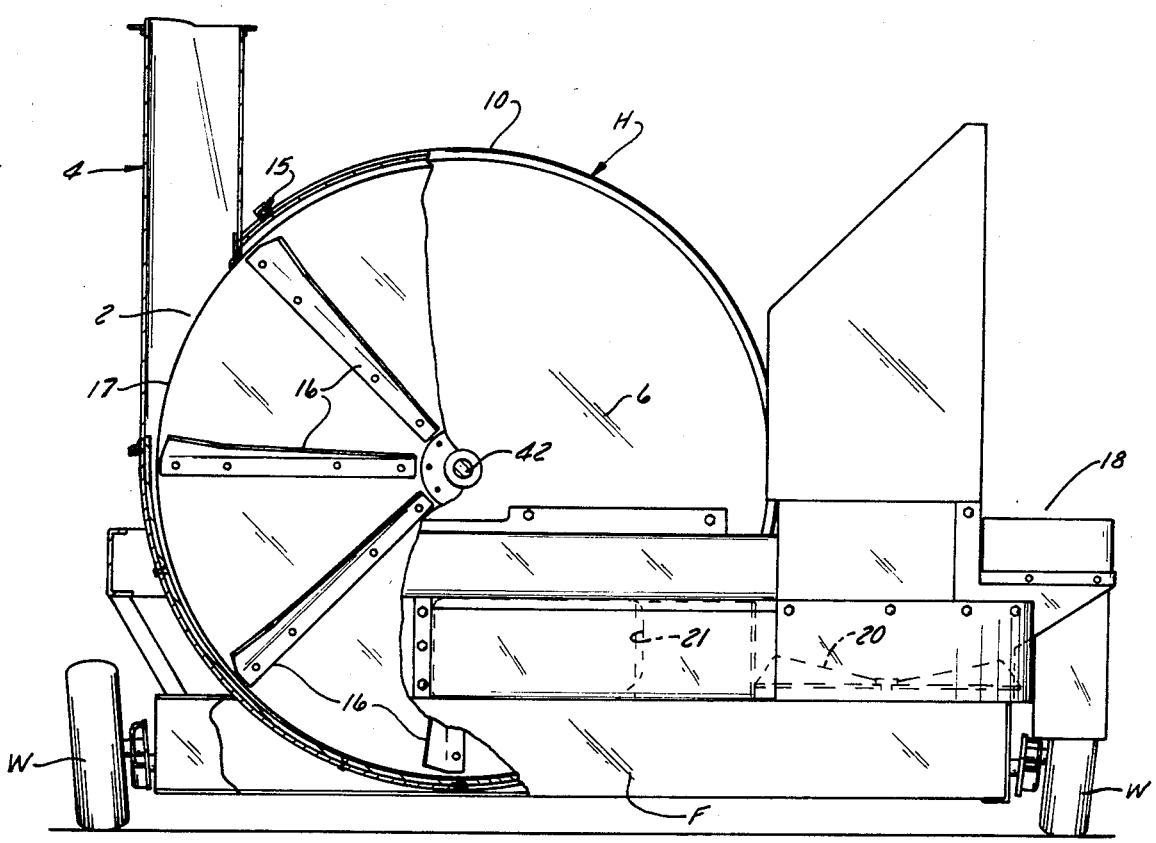
FIG. 2 is an elevational view partially in section, taken from the back side of the blower, certain parts being broken away or removed for the sake of clarity.

The fan paddles 16 and the fan itself are conventional and include the large central wheel or disc member 17, commonly referred to as the fan. If a more complete description of this fan is deemed to be necessary or desirable, reference may be had to the said U.S. Pat. No. 3,724,908. Referring generally to the frame of the blower, the main frame F is shown as being mounted on ground wheels W in the conventional manner and as described in said U.S. Pat. No. 3,724,908. The forage material is dumped from a vehicle such as a wagon into the hopper 18 (FIG. 1) and is fed by the pair of horizontally disposed rotatable paddles 19 and 20 into the side walls 6 and 8 of the blower. One of the forage inlet openings 21 into the blower is shown in FIG. 2 by the dotted lines. Thus, the material enters the blower through the openings 21 and is conveyed circumferentially approximately ninety degrees within the housing to the discharge outlet transition member.

Transmission Means

Figures 3, 4:
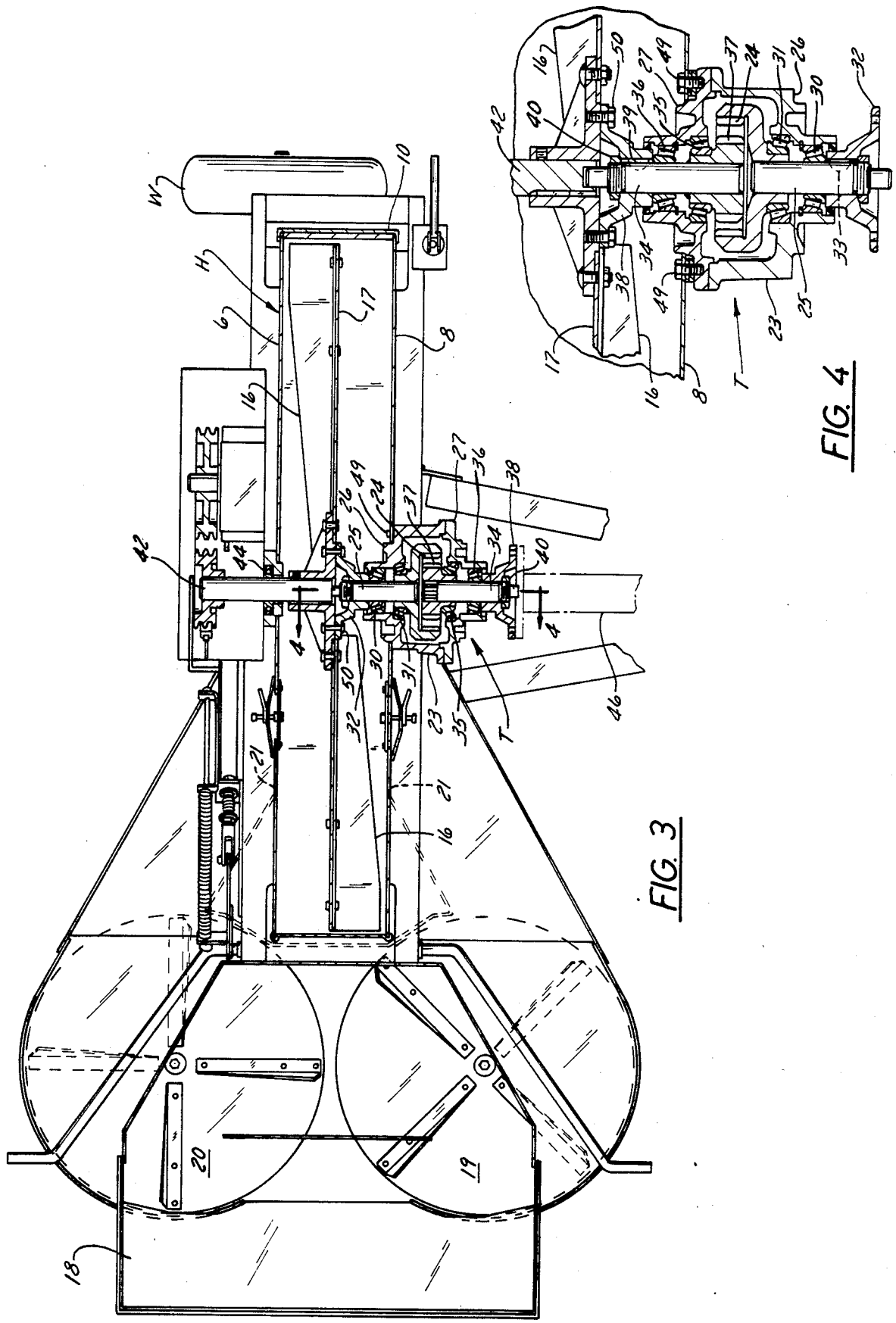
FIG. 3 is a plan view of the blower provided by the present invention, certain parts being shown in section, broken away or removed for the sake of clarity in the drawings, the view showing the transmission between the power input to the blower and the blower rotor.
FIG. 4 is a fragmentary enlarged view of the transmission shown in FIG. 3, taken along line 4—4, but showing the transmission unit when in the end-for-end reversed position to result in a different speed input to the blower.

Transmission means are provided for the blower fan wheel 17 as shown in FIGS. 3 and 4. The transmission T includes a casing 23 which houses an internal gear 24 that is fixed to a stub shaft 25. The casing has opposite sides 26 and 27. The stub shaft 25 is journalled in anti-friction bearing assemblies 30 and 31 within the casing. The outer end of the shaft 25 has a flange coupling 32 rotationally secured to it by means of a key 33. A third shaft 34 is similarly mounted within the casing on anti-friction bearing assemblies 35 and 36. To the inner end of shaft 34 is fixed a pinion 37 which is in constant mesh with the internal gear 24, and eccentrically disposed with respect to it. The outer end of shaft 34 has a flanged coupling 38 fixed rotationally thereto by means of the key 39. A conventional lock nut 40 threaded on the end of shaft 34 also helps secure the coupling 38 on the flange.

The transmission T is reversible end for end, that is to say either the shaft 34 or the shaft 25 can be inserted in the shaft 42 of the fan paddle wheel 17. The shaft 42 is journalled in the bearing 44 which is fixed to the one side sheet 6 of the blower. As shown in FIG. 3, the outer end of shaft 34 is adapted to be connected to the power takeoff shaft 46 (FIG. 1) in the conventional manner. Thus, the speed from the power takeoff shaft is reduced through the pinion gear 37 and internal gear 24 so that the speed of the blower fan is consequently reduced. More specifically, a speed of 1000 RPM at the PTO can be reduced to approximately 735 RPM at the fan wheel.

The transmission can be reversed end for end as shown in FIG. 4 so that the outer end of shaft 34 is connected with the blower wheel fan 17 and the outer end of shaft 25 is connected to the PTO shaft. In this manner a PTO speed of 540 RPM can be increased to approximately 735 RPM at the fan. It will be noted from FIG. 3 that the casing 23 is secured to one of the side walls 8 of the blower housing by means of the cap screws 49. The flange 32 is secured to the hub of the fan wheel by means of capscrews 50. As shown in FIG. 4, when the transmission is reversed, the casing is similarly secured to the side wall of the blower 8 and the coupling 38 is secured by bolt means 50 to the hub of the fan wheel.

Thus, a transmission is provided for either speeding up or reducing the speed of the forage blower and can be mounted on the front side sheet of the blower and consequently eliminates the need for a front blower bearing, a coupling means between the blower and transmission and also reduces the length of overhung drive line components.

In either position of the transmission the rotation direction remains the same.

The transmission itself is used as the front bearing for the blower and as a direct part of the drive line, resulting in reliable driving characteristics and a reduced overall cost.

I claim:

1. A forage blower having vertically positioned blower housing of generally circular shape when viewed in elevation and which has a generally tangentially extending blower outlet pipe extending upwardly from said housing, a pair of generally circular and laterally spaced apart side sheets, an annular peripheral rim sheet mounted around the periphery of said sheets, a blower fan wheel rotatably journalled in said housing for conveying forage, said fan wheel having a shaft extending from one side thereof and mounted in a bearing in one of said side sheets, said fan wheel having a central hub member, and a transmission unit secured to the other side sheet and connectible with said fan wheel for driving engagement therewith, said transmission unit including a casing having oposite sides, means for selectively securing either one of said sides to said other side sheet, a second shaft, said second shaft being rotatably journalled on anti-friction bearings within said transmission unit and having an outer end extending therefrom and connected to said fan wheel, a third shaft rotatable in said transmission unit, said third shaft having an outer end extending from said transmission unit, whereby said outer end of said third shaft can be driven by a power source, said transmission unit being reversible end for end whereby the outer end of either of said second or third shafts can be drivingly connected with said fan wheel shaft while the other of said shafts is connected in driving relationship with a power source.

2. A forage blower having a vertically positioned blower housing of generally circular shape when viewed in elevation and which has a generally tangentially extending blower outlet pipe extending upwardly from said housing, a pair of generally circular and laterally spaced apart side sheets, an annular peripheral rim sheet mounted around the periphery of said sheets, a blower fan wheel rotatably journalled in said housing for conveying forage which is fed into said housing outwardly through said blower outlet pipe, said fan wheel having a shaft extending from one side thereof and mounted in a bearing in one of said side sheets, said fan wheel having a central hub member in which said shaft is secured, and a transmission unit secured to the other side sheet and connectible with said fan wheel for driving engagement therewith, said transmission unit including a casing having opposite sides, means for selectively securing either one of said sides to said other side sheet, an internal gear secured to a second shaft, said second shaft being rotatably journalled on anti-friction bearings within said casing and having an outer end extending therefrom, coupling means rigidly secured to said outer end, said transmission unit also having a pinion gear in said casing and in constant mesh with said internal gear, a third shaft fixed to said pinion gear for driving engagement therewith and having an outer end extending from said casing, and coupling means secured to said outer end of said third shaft, said transmission unit being reversible end for end whereby the outer end of either of said second or third shafts can be drivingly connected with said fan wheel shaft via one coupling means while the other of said shafts is connected in driving relationship with a power source via the other coupling means.

3. A forage blower having a vertically positioned blower housing of generally circular shape when viewed in elevation and which has a generally tangentially extending blower outlet pipe extending upwardly from said housing, a pair of generally circular and laterally spaced apart side sheets, an annular peripheral rim sheet mounted around the periphery of said sheets, a blower fan wheel rotatably journalled in said housing for conveying forage which is fed into said housing outwardly through said blower outlet pipe, said fan wheel having a shaft extending from one side thereof and mounted in a bearing in one of said side sheets, said fan wheel having a central hub member in which said shaft is secured, and a transmission unit secured to the other side sheet and connectible with said fan wheel for driving engagement therewith, said transmission unit comprising, a casing having opposite sides, and means for selectively securing either one of said sides to said other side sheet, sand transmission unit also including an internal gear secured to a second shaft, said second shaft being rotatably journalled on anti-friction bearings within said casing and having an outer end extending therefrom, coupling means rigidly secured to said outer end, said transmission unit also having a pinion gear in said casing and in constant mesh with said internal gear, a third shaft fixed to said pinion gear for driving engagement therewith and having an outer end extending from said casing, and coupling means secured to said outer end of said third shaft, said transmission unit being reversible end for end whereby the outer end of either of said second or third shafts can be drivingly connected with said fan wheel shaft via one coupling means while the other of said shafts is connected in driving relationship with a power source via the other coupling means.

4. A forage blower having a vertically positioned blower housing of generally circular shape when viewed in elevation and which has a generally tangentially extending blower outlet pipe extending upwardly from said housing, a pair of generally circular and laterally spaced apart side sheets, an annular peripheral rim sheet mounted around the periphery of said sheets, a blower fan wheel rotatably journalled in said housing for conveying forage which is fed into said housing outwardly through said blower outlet pipe, said fan wheel having a shaft extending from one side thereof and mounted in a bearing in one of said side sheets, said fan wheel having a central hub member in which said shaft is secured, and a transmission unit secured to the other side sheet and connectible with said fan wheel for driving engagement therewith, said transmission including a casing having opposite sides, a second shaft, said second shaft being rotatably journalled on anti-friction bearings within said casing and having an outer end extending therefrom, and connected to said first shaft, a third shaft rotatable in said casing, and having an outer end extending from said casing, whereby the outer end of said third shaft can be drivingly connected with a power source, said transmission unit being reversible end for end whereby the outer end of either of said second or third shafts can be drivingly connected with said fan wheel shaft while the other of said shafts is connected in driving relationship with a power source.

* * * * *